United States Patent
Schmidt

(10) Patent No.: US 10,127,749 B2
(45) Date of Patent: Nov. 13, 2018

(54) SYSTEM AND METHOD FOR PROFILE INDICATION ON A KEY FOB

(71) Applicant: Ford Global Technologies, LLC, Dearborn, MI (US)

(72) Inventor: Kyle Schmidt, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/992,913

(22) Filed: Jan. 11, 2016

(65) Prior Publication Data
US 2017/0200336 A1    Jul. 13, 2017

(51) Int. Cl.
| G05B 11/01 | (2006.01) |
| G08C 19/16 | (2006.01) |
| G07C 9/00 | (2006.01) |
| G08C 17/02 | (2006.01) |

(52) U.S. Cl.
CPC ......... *G07C 9/00174* (2013.01); *G08C 17/02* (2013.01); *G07C 2009/00769* (2013.01); *G07C 2009/00984* (2013.01)

(58) Field of Classification Search
CPC ...... G07C 9/00174; G07C 2009/00769; G07C 2009/00984; G08C 17/02
See application file for complete search history.

(56) References Cited

U.S. PATENT DOCUMENTS

| 4,937,626 A | * | 6/1990 | Kohtani | G03G 15/0126 399/12 |
| 4,963,920 A | * | 10/1990 | Fukushima | G03G 15/04018 355/40 |
| 6,041,410 A | * | 3/2000 | Hsu | G06K 9/00013 380/285 |
| 7,042,342 B2 | | 5/2006 | Luo et al. | |
| 8,299,907 B2 | | 10/2012 | Vandenbrink et al. | |
| 8,626,357 B1 | | 1/2014 | Lickfelt | |
| 8,791,804 B2 | | 7/2014 | Campbell et al. | |

(Continued)

FOREIGN PATENT DOCUMENTS

DE    102008015772 B3    4/2009

OTHER PUBLICATIONS

Search Report dated Jul. 10, 2017 for Great Britain Patent Application No. GB1700411.0 (4 Pages).

*Primary Examiner* — Erin M File
(74) *Attorney, Agent, or Firm* — James P. Muraff; Neal, Gerber & Eisenberg LLP

(57) ABSTRACT

A key fob associated with a select one of a plurality of driver profiles stored in a vehicle memory is provided. The key fob comprises a memory for storing a profile indication for identifying the driver profile associated with the key fob, and an output device for presenting the profile indication. Another embodiment provides a wireless system comprising a vehicle storing driver profiles in a memory, and a key fob associated with a select profile and comprising an output device for presenting a profile indication assigned to that profile. Another embodiment includes a method of providing a profile indication on a key fob associated with one of the driver profiles stored in the vehicle. The method comprises transmitting an identifier to the vehicle, receiving a profile indication associated with the identifier from the vehicle, and presenting the profile indication on an output device of the key fob.

6 Claims, 4 Drawing Sheets

(56) References Cited

U.S. PATENT DOCUMENTS

| | | | | |
|---|---|---|---|---|
| 8,977,408 B1* | 3/2015 | Cazanas | ............... | H04L 41/082 455/3.03 |
| 2002/0109587 A1* | 8/2002 | Attring | ............... | B60R 25/1004 340/426.1 |
| 2005/0275511 A1* | 12/2005 | Luo | ............... | B60R 25/00 340/426.17 |
| 2006/0054484 A1* | 3/2006 | Uleski | ............... | G07C 9/00944 200/341 |
| 2006/0219776 A1* | 10/2006 | Finn | ............... | B60R 25/25 235/380 |
| 2007/0262848 A1* | 11/2007 | Berstis | ............... | G07C 9/00944 340/3.9 |
| 2008/0117079 A1* | 5/2008 | Hassan | ............... | B60R 25/045 340/901 |
| 2009/0091477 A1* | 4/2009 | McCall | ............... | G01S 19/42 340/990 |
| 2009/0264082 A1* | 10/2009 | Tieman | ............... | G01S 1/66 455/73 |
| 2010/0246197 A1* | 9/2010 | Takahashi | ............... | F21S 6/004 362/430 |
| 2010/0308986 A1* | 12/2010 | Dobryden | ............... | G08C 17/02 340/438 |
| 2011/0080278 A1 | 4/2011 | Crombez et al. | | |
| 2012/0313768 A1* | 12/2012 | Campbell | ............... | B60R 25/2009 340/438 |
| 2013/0038241 A1* | 2/2013 | Johannessen | ............... | H05B 33/0869 315/294 |
| 2013/0166104 A1* | 6/2013 | Creguer | ............... | G08C 19/00 701/2 |
| 2014/0142805 A1* | 5/2014 | Frye | ............... | B60R 16/023 701/36 |
| 2014/0145841 A1* | 5/2014 | Abboud | ............... | G07C 5/08 340/439 |
| 2014/0200737 A1* | 7/2014 | Lortz | ............... | B60R 25/25 701/1 |
| 2014/0357187 A1* | 12/2014 | Ehrensvard | ............... | H04L 63/0838 455/41.1 |
| 2015/0081552 A1* | 3/2015 | Stewart | ............... | G06Q 20/40145 705/44 |
| 2015/0180710 A1 | 6/2015 | Cazanas et al. | | |
| 2016/0261425 A1* | 9/2016 | Horton | ............... | G05B 15/02 |

* cited by examiner

SYSTEM AND METHOD FOR PROFILE INDICATION ON A KEY FOB

TECHNICAL FIELD

This application generally relates to pre-stored driver profiles for a vehicle and more specifically, to a profile indicator on an electronic key fob apparatus for controlling functions in the vehicle.

BACKGROUND

Many vehicles include a remote keyless system (RKS) for enabling access to the vehicle, or control of vehicle functions, without using a traditional key or other mechanical device, or otherwise making physical contact with the vehicle. Typically, remote keyless systems include a remote control linked to the vehicle and comprising buttons or switches for enabling control of various vehicle functions. The remote control can be in the form of an independent key fob separate from an ignition key of the vehicle, or a key fob built into the ignition key handle. The key fob can include buttons or other controls for a remote keyless entry (RKE) system, for example, to enable remote control of vehicle doors (e.g., locking and unlocking the door locks) and a trunk or tailgate (e.g., opening and/or closing). Some key fobs also include a button or other control for a remote keyless ignition (RKI) system, for example, to enable remote, keyless start of the vehicle's engine. In addition, key fobs typically include a red panic button for activating the vehicle's alarm system.

Some conventional vehicles are linked to multiple key fobs, and each key fob is paired to, or associated with, a different user or driver profile stored in a memory or electronic control unit (ECU) of the vehicle. For example, some vehicles can store profiles for a number of different users or drivers, with each driver profile including one or more customized settings for user-configurable features of the vehicle, such as, for example, seat position, position of mirrors, one or more pedal positions, radio station presets, HVAC settings, navigation screen configuration, and the like. In such cases, each vehicle user can adjust any or all of the user-configurable features of the particular vehicle and save the selected settings to the memory of the vehicle as the user's own driver profile. Further, each of the key fobs for the vehicle can be assigned to a select one of the driver profiles stored in the vehicle memory and can be configured to inform the vehicle of the assigned driver profile each time the user enters the vehicle using that key fob. In response, the vehicle can recall the appropriate driver profile and quickly restore the user's pre-selected settings.

The above arrangement may be especially helpful for family cars where multiple family members (e.g., husband, wife, driving-age children, etc.) share the same vehicle and have different preferences. However, existing key fobs are not capable of indicating which driver profile is assigned to each key fob. Therefore, if multiple key fobs for the same car are located in one place, for example, the users may have difficulty differentiating between the key fobs or identifying the key fob that is programmed for, or assigned to, their own driver profile.

Accordingly, there is still a need in the art for a vehicle key fob configured to indicate the driver profile associated with the key fob.

SUMMARY

The invention is intended to solve the above-noted and other problems by providing systems and methods for indicating which of a plurality of driver profiles is associated with a given vehicle key fob. Among other things, the systems and methods include presenting a profile indication on the key fob for identifying a select one of a plurality of driver profiles stored in the vehicle, where the profile indication is presented by an output device on the key fob.

For example, one embodiment provides a key fob associated with a select one of a plurality of driver profiles stored in a vehicle memory. The key fob comprises a memory configured to store a profile indication for identifying the driver profile associated with the key fob, and an output device in communication with the memory and configured to present the profile indication.

Another example embodiment provides a wireless system comprising a vehicle comprising a memory configured to store a plurality of driver profiles; and a key fob in wireless communication with the vehicle and associated with a select one of the driver profiles, the key fob comprising an output device configured to present a profile indication assigned to the select one of the driver profiles.

Yet another example embodiment provides a method of providing a profile indication on a key fob in communication with a vehicle and associated with one of a plurality of driver profiles stored in the vehicle. The method comprises transmitting an identifier to the vehicle, receiving a profile indication associated with the identifier from the vehicle, and presenting the profile indication on an output device of the key fob.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
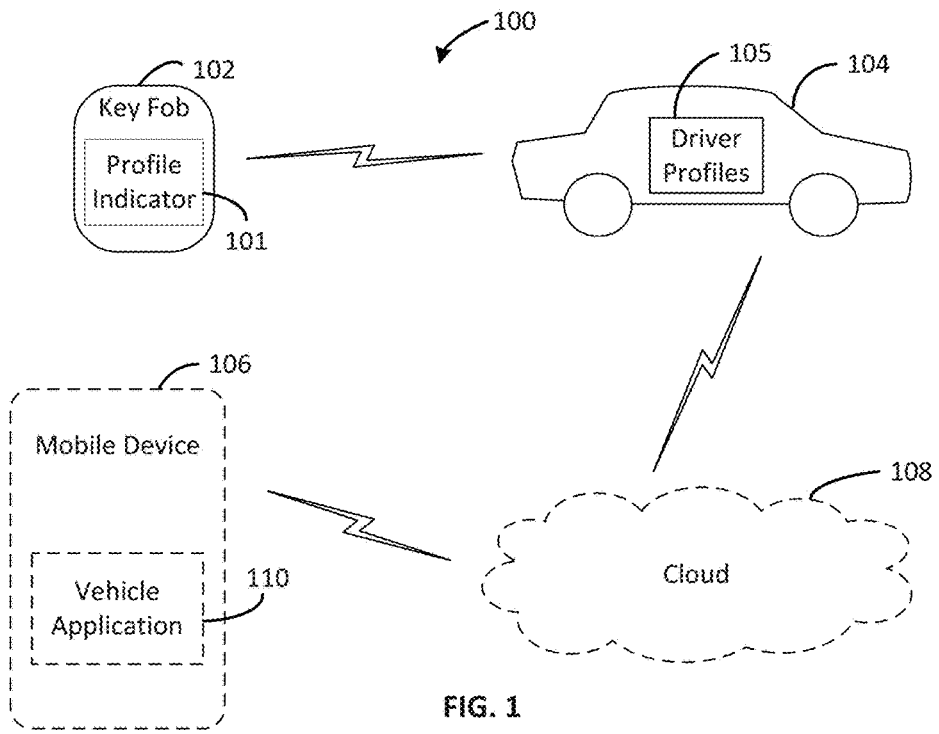
FIG. 1 is a block diagram of an example wireless system comprising a vehicle key fob paired to a vehicle, in accordance with certain embodiments

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

FIG. 1 illustrates an example wireless system 100 for providing a profile indicator 101 on a key fob apparatus 102 associated with, or paired to, a vehicle 104 comprising a plurality of driver profiles 105, in accordance with embodiments. The vehicle key fob apparatus 102 (also referred to herein as a "key fob") is configured to provide a user with remote, keyless control of various operations or functions of the vehicle 104, including, but not limited to, locking and unlocking door locks or other electronic locks of the vehicle 104, opening and/or closing a trunk, tailgate, sliding door, or other electronically-operated door of the vehicle 104, opening and/or closing a window or roof of the vehicle 104, starting an engine of the vehicle 104, and/or activating an alarm system of the vehicle 104. The key fob apparatus 102 may be pre-configured to enable direct control of these operations of the vehicle 104 by the vehicle manufacturer or an entity associated therewith. As will be appreciated, other vehicle functions may be controllable by the key fob 102, and the present disclosure is intended to cover any and all such key fob operations.

Figure 2:
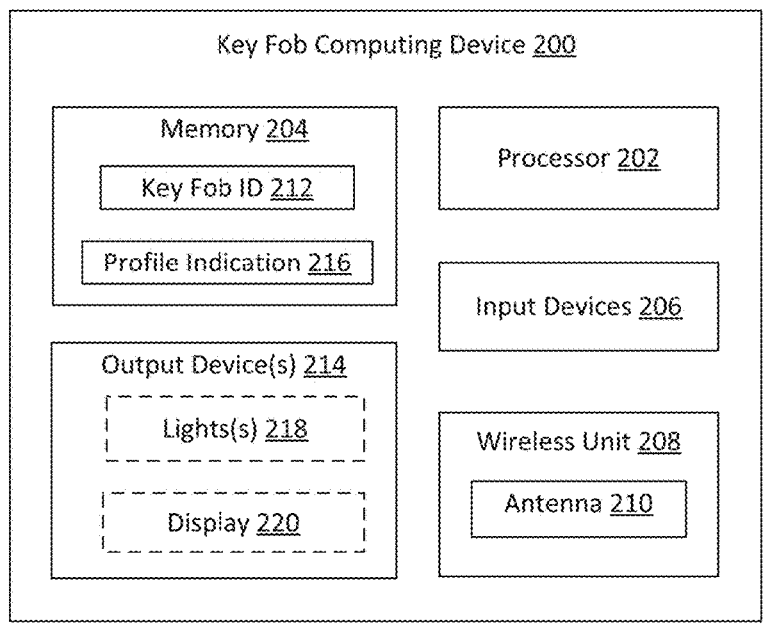
FIG. 2 is a block diagram of an example computing system including in the vehicle key fob of FIG. 1, in accordance with certain embodiments.

FIG. 2 depicts an exemplary computing device 200 included in the key fob apparatus 102, accordance with embodiments. The computing device 200 can be configured to enable control of the various vehicle operations or functions and communicate command inputs entered into the key fob 102 to the vehicle 104. As shown, the key fob computing device 200 includes a data processor 202 and a memory 204 for facilitating the key fob operations. For example, when the computing device 200 is in operation, the processor 202 can be configured to execute software stored within the memory 204, to communicate data to and from the memory 204, and to generally control operations of the computing device 200 pursuant to the software. In particular, the memory 204 can house software for execution by the processor 202 to facilitate interactions between the key fob 102 and the vehicle 104.

The processor 202 is a hardware device and can be any custom made or commercially available processor, including a semiconductor based microprocessor (in the form of a microchip or chip set), another type of microprocessor, or generally any device for executing software instructions. The memory 204 includes any one, or a combination of, volatile memory elements (e.g., random access memory (RAM, such as DRAM, SRAM, SDRAM, etc.)) and non-volatile memory elements (e.g., ROM, hard drive, tape, CDROM, etc.). Moreover, the memory 204 may incorporate electronic, magnetic, optical, and/or other types of storage media. The memory 204 may include a computer readable medium configured to store software for implementing the system 100 and/or the techniques described here.

As shown in FIG. 2, the key fob 102/200 includes a plurality of input devices 206 that can be operated by the user to convey operational commands to the vehicle 104 for controlling the various vehicle functions. The input devices 206 can be any type of input device, including, but not limited to, buttons or push buttons, sliders, switches, knobs, dials, and/or touch input devices. Further, each input device 206 can be configured to enable control of at least one vehicle function.

FIGS. 3-6 depict various exemplary embodiments of the key fob apparatus 102 and example input devices 206 included therein. As shown, the plurality of input devices 206 can include a door lock input device 206a for locking the vehicle doors, a door unlock input device 206b for unlocking one or more of the vehicle doors, a panic input device 206c for activating the vehicle alarm system, and a remote start input device 206d for remotely starting the vehicle ignition. In the illustrated embodiments, the input devices 206 are push buttons that can be selectively pressed by the user to activate performance of the vehicle function(s) associated therewith. In some cases, at least some vehicle functions are performed upon receiving a single user input (e.g., a single press) at the input device 206 for controlling said vehicle function, while other vehicle functions may be performed upon receiving a certain sequence or combination of inputs (e.g., a double press) at one or more of the input devices 206.

In embodiments, the key fob 102 can wirelessly communicate with the vehicle 104, for example, when the key fob 102 is within a predetermined distance (e.g., 200 meters) of the vehicle 104. In some cases, the key fob 102 can be configured for passive communication with the vehicle 104. For example, the key fob 102 may continuously transmit a wireless signal, and the vehicle 104 may continuously look for the transmitted wireless signal, so that the two can be automatically connected once the key fob 102 is within the predetermined distance of the vehicle 104. In other cases, the key fob 102 can be configured for active communication with the vehicle 104. For example, the vehicle 104 may continuously search for a transmitted wireless signal from the key fob 102, but the key fob 102 may only send the wireless signal, or be "visible" to the vehicle 104, once the user selects, or operates, one of the input devices 206 on the key fob 102. In such cases, the key fob 102 and the vehicle 104 are connected only in response to user operation of the key fob 102.

As shown in FIG. 2, the key fob 102/200 includes a wireless unit 208 to facilitate wireless communication with the vehicle 104. In some embodiments, the key fob 102 is configured only for one-directional communication with the vehicle 104. For example, the wireless unit 208 may be configured only to transmit user-entered commands to the vehicle 104. In other embodiments, the key fob 102 is configured for bi-directional communication with the vehicle 104. For example, the wireless unit 208 may be configured to transmit command inputs to, and receive commands or other information from, the vehicle 104.

The wireless unit 208 comprises an antenna 210 communicatively coupled to one or more receivers, transmitters, and/or transceivers (not shown) for receiving input signals from the vehicle 104 and/or transmitting commands or other output signals to the vehicle 104. In embodiments, the wireless unit 208 is configured for at least one type of short-range wireless communication technology, such as, for example, radio frequency (RF), Bluetooth, infrared, and/or NFC technology. In a preferred embodiment, the key fob 102 communicates with the vehicle 104 using RF technology. In other embodiments, the wireless unit 208 can also be configured for longer-range or broadband wireless communication technology, such as, for example, WiFi, WiMax, other wireless Ethernet, cellular, GPS, and/or satellite technology.

As shown in FIG. 2, a unique identifier 212, or a distinct digital identity code, can be assigned to the key fob apparatus 102 and stored in the memory 204 of the key fob computing device 200. The unique identifier 212 (also referred to as "key fob ID 212") can be used to communicatively link or pair the key fob 102 to the vehicle 104. For example, the vehicle 104 can be configured to store the key fob ID 212 of each key fob paired to, or associated with, the vehicle 104, and to only perform commands that are received from key fobs having an ID that matches one of the stored key fob IDs 212 (e.g., a valid key fob ID). In some cases, the key fob 102 may transmit the key fob ID 212 with, or just prior to, each user-entered key fob command, so that the vehicle 104 can easily validate the source of the command.

To establish a communication link with the vehicle 104, the key fob 102 may be placed in an initial programming mode during which the key fob 102 emits an RF signal, or other wireless signal, comprising the unique identifier 212 for reception by the vehicle 104. The vehicle 104, or more specifically, an on-board vehicle computing system (VCS) (such as, e.g., VCS 800 shown in FIG. 8), receives the RF signal and saves the unique identifier 212 in a vehicle memory (such as, e.g., data storage device 804 shown in FIG. 8). During subsequent key fob operations, the vehicle 104 can authenticate the key fob 102 by comparing a received unique identifier to the key fob ID(s) 212 stored in the vehicle memory. In cases where the vehicle 104 is paired to multiple key fobs, the vehicle memory may include a key fob ID for each of the paired key fobs. In some embodiments, the key fob 102 is pre-programmed for the vehicle 104 by the vehicle manufacturer and/or the key fob manufacturer. In other embodiments, the key fob 102 can be individually programmed by the user or vehicle driver to pair with the vehicle 104.

According to embodiments, the key fob 102 can be associated with, or linked to, a select one of the pre-specified driver profiles 105 generated for, and stored in, the vehicle 104. For example, the vehicle 104 can be associated with a plurality of key fobs (not shown), and each of the key fobs can be associated with a respective one of the driver profiles 105. As shown in FIG. 1, the vehicle 104 stores the driver profiles 105 in a vehicle memory (such as, e.g., data storage device 804 shown in FIG. 8). Each of the driver profiles 105 can comprise customized settings selected by a corresponding user or driver for user-configurable features of the vehicle 104, such as, for example, seat position, mirror position(s), pedal position(s), radio station presets, heating/air-conditioning settings, navigation screen configuration, audio settings, and the like. When the driver uses the key fob 102 to access the vehicle 104, the vehicle 104 (or more specifically, VCS 800 shown in FIG. 8) is configured to automatically recall the driver profile 105 associated with the key fob 102 from the vehicle memory and apply the user-customized settings to the vehicle 104.

In embodiments, the profile indicator 101 of the key fob 102 is configured to visually indicate which of the driver profiles 105 is linked to, or associated with, the key fob 102, in order to superficially or outwardly differentiate the key fob 102 from other key fobs that are paired to the same vehicle 104, but are associated with different driver profiles 105. For example, as shown in FIG. 2, the key fob computing device 200 can include at least one output device 214 configured to visually present a profile indication 216 that is assigned to the driver profile 105 associated with the key fob 102. The profile indication 216 can be stored in the memory 204 of the key fob computing device 200, as shown in FIG. 2. In such cases, the output device(s) 214 can serve as the profile indicator 101 of the key fob 102, and each key fob 102/200 paired to the vehicle 104 can have a different type of profile indication 216 stored in its memory 204.

In embodiments, the profile indication 216 can be any type of output capable of being presented by the output device(s) 214 of the key fob 102/200 and stored in the memory 204 of the key fob computing device 200. For example, in some embodiments, the output device(s) 214 can include one or more light devices 218 that are configured to visually indicate the associated driver profile 105 using a light display emitted by the device(s) 218. In such cases, the profile indication can be an identification of the light device(s) 218 to be activated, for example, if there are multiple light devices 218, or an identification of the type of light display to be emitted by the light device 218, for example, if there is only one light device 218. In other embodiments, the output device(s) 214 include a display device 220 that is configured to visually indicate the associated driver profile 105 by displaying a graphic (e.g., an icon, textual message, image, etc.) associated with the profile 105. In some cases, in addition to, or instead of, visual profile indications, the profile indicator 101 may include other types of output device(s) 214 for presenting non-visual profile indications, such as, for example, audio devices (not shown) configured to output a unique sound for each driver profile 105 and/or haptic devices (not shown) configured to output a unique haptic cue (e.g., vibration(s) or buzz(es)) for each profile 105.

In some embodiments, the profile indication 216 can be presented on the key fob 102 for only a predetermined period of time (e.g., five seconds) in order to preserve power and minimize usage of the output device(s) 214. For example, the output device(s) 214 can be configured to light up or activate only upon selection of one of the input devices 206 and can be further configured to deactivate, or enter a "sleep mode," after passage of the predetermined time period.

Figure 3:
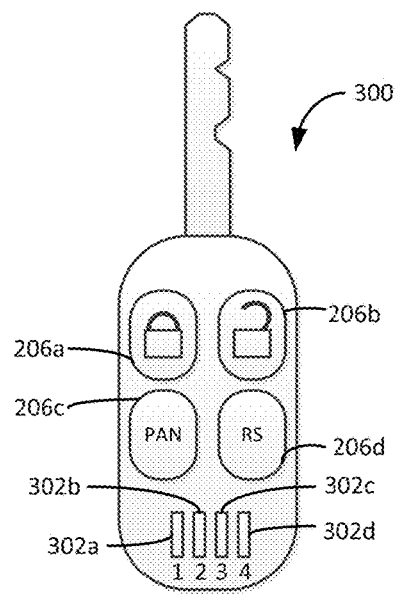
FIGS. 3 through 6 illustrate various exemplary embodiments of a vehicle key fob configured to indicate a driver profile associated with the key fob, in accordance with certain embodiments.
Figure 4:
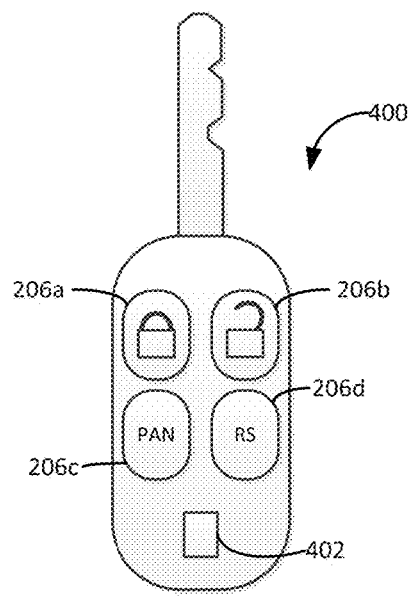
Figure 5:
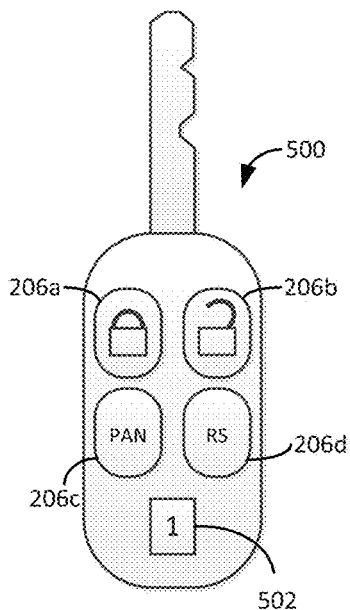
Figure 6:
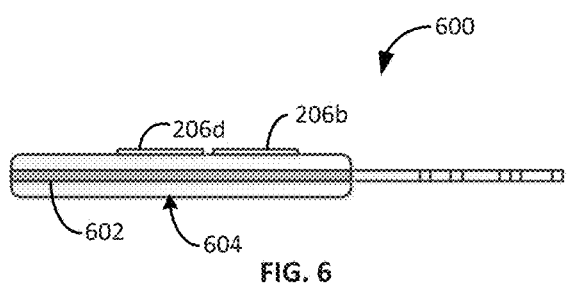

FIGS. 3-6 depict various exemplary embodiments of the output devices 214 (or more specifically, the light device(s) 218 and the display device 220) that may be included on the key fob 102 as the profile indicator 101. In some embodiments, the output device(s) 214 are located on a front face of the key fob 102 adjacent to the input devices 206, as shown in FIGS. 3-5. In other embodiments, the output device(s) 214 can be located on another side or face of the key fob 102, including, for example, on a back surface (not shown) of the key fob 102, or on a left and/or right side, as shown in FIG. 6.

Referring now to FIG. 3, shown is an exemplary key fob 300 with a profile indicator 302 comprising a plurality of light emitting devices (LEDs) that are configured to present the profile indication 216, in accordance with embodiments. Each of the LEDs 302a, -b, -c, or -d can be configured to represent or signify a different driver profile 105. For example, LED 302a may be assigned to a first driver profile of the plurality of profiles 105 and can be activated or turned on if the key fob 300 is paired with the first driver profile. Likewise, LED 302b may be assigned to a second driver profile from the plurality of profiles 105 and can be activated if the key fob 300 is paired with the second driver profile. Also, LED 302c may be assigned to a third driver profile and can be activated if the key fob 300 is paired with the third driver profile. Further, LED 302d may be assigned to a fourth driver profile and can be activated if the key fob 300 is paired with the fourth driver profile. In such embodiments, the profile indication 216 stored in the key fob 300 can include an identification of the specific LED 302a, 302b, 302c, or 302d that is assigned to the driver profile 105 associated with the key fob 300 and therefore, is to be activated by the profile indicator 302.

In some cases, each of the LEDs 302 is configured to emit a different colored light (e.g., red, green, blue, yellow, etc.) when activated, to further facilitate the profile indication feature of the key fob 300. For example, each driver profile 105 may be assigned a different color, and the driver may identify the key fob 300 that is linked to his driver profile 105 based on the color of the activated LED 302. In other cases, all of the LEDs 302 can be configured to output the same colored light (e.g., red) when activated, but each LED 302 can have a different number (e.g., 1, 2, 3, 4), as shown in FIG. 3. In such cases, each driver profile 105 may be assigned a different number, and the driver can then identify the key fob 102 linked to his driver profile 105 based on the number of the activated LED 302.

While FIG. 3 shows four LEDs 302, it will be appreciated that the number of LEDs 302 may differ depending on the number of key fobs 300 associated with the vehicle 104 and/or the number of driver profiles 105 that can be stored in the vehicle 104. For example, in some cases, the vehicle manufacturer may configure the vehicle 104 to accept only three driver profiles 103, and so the key fob 300 may be configured to include only three LEDs 302. In other cases, the key fob 300 may be configured to include a standard number of LEDs 302 regardless of the number of driver profiles 105 stored in the vehicle 104 and/or the number of key fobs 300 provided with the vehicle 104. Moreover, while the key fob 300 includes LEDs 302 as the output lights 218, it will be appreciated that other types of light sources may be used instead for the output lights 218.

FIG. 4 depicts an exemplary key fob 400 with a profile indicator 402 comprising a single light device that is configured to present the profile indication 216 on the key fob 400, in accordance with embodiments. The light device 402 can be a multi-colored LED capable of emitting different light colors, and each light color can be assigned to a different driver profile 105. In such cases, the profile indication 216 stored in the key fob 400 can include an identification of the light color that is assigned to the driver profile 105 associated with the key fob 400 and therefore, is to be displayed by the light device 402. The light device 402 can be any type of light source capable of emitting different colors. As an example, the light device 402 can include a plurality of LED emitters within a single casing, with each emitter having a different colored light output and a separate lead to enable independent control thereof. As will be appreciated, the number of possible light colors for the light device 402 can determine the number of driver profiles 105 stored in the vehicle 104 and/or the number of key fobs 400 provided with the vehicle 104. In one example embodiment, the light device 402 is a three-color LED capable of emitting three different colored lights (e.g., red, green, and blue). In such case, the key fob 400 can be associated with one of three different driver profiles 105 for the vehicle 104.

FIG. 5 depicts an exemplary key fob 500 with a profile indicator 502 comprising a display device configured to indicate the driver profile 105 that is associated with the key fob 500, in accordance with embodiments. The display device 502 can be any type of display screen capable of displaying the profile indication 216 on the key fob 500. For example, the display device 502 can be, or include, an LCD display, an OLED display, an LED-based display, and/or an e-ink or electronic paper display. Further, the profile indication 216 displayed on the display device 502 and stored in the key fob 500 can include any type of graphical message (e.g., icon, symbol, logo, or image, such as, e.g., a flower, a soccer ball or other sports equipment, a flag, an animal, a person or person's face, a photograph, etc.) and/or textual message (such as, e.g., one or more letters, numbers, and/or characters). In the illustrated embodiment, the profile indication 216 is the number "1" displayed on the display screen 502 to indicate that the key fob 500 is associated with "driver profile 1" for the vehicle 104.

FIG. 6 depicts an exemplary key fob 600 with a profile indicator 602 comprising a light device that is configured to present the profile indication 216 and is coupled to, or embedded into, a side surface 604 of the key fob 600, in accordance with embodiments. As shown, the light device 602 extends along at least one side 604 of the key fob 600. In some embodiments, the light device 602 wraps around a substantial portion of an outer edge of the key fob 600, such that the profile indication 216 can be seen on the key fob 600 from multiple angles. For example, the light device 602 may extend along at least three sides of the key fob 600, such as, for example, a top side (not shown), the side surface 604, and an opposing side surface (not shown). Like the light device 402, the light device 602 can be a multi-colored LED that is capable of emitting different light colors, and each light color can be assigned to a different driver profile 105. In such embodiments, the profile indication 216 stored in the key fob 600 can include an identification of the light color that is assigned to the driver profile 105 associated with the key fob 600 and therefore, is to be displayed by the light device 402. In one exemplary embodiment, the light device 602 is a three-color LED capable of emitting three different colored lights, and the key fob 600 is associated with one of three different driver profiles 105 for the vehicle 104.

Figure 7:
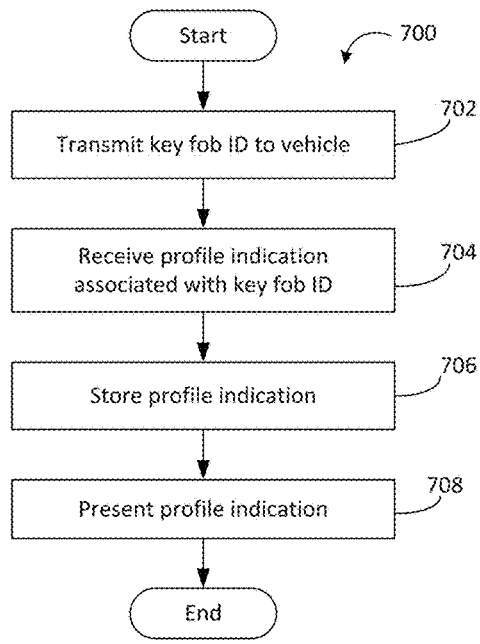
FIG. 7 is a flow diagram of an example method for indicating, on a vehicle key fob, a driver profile associated with the key fob, in accordance with certain embodiments.

FIG. 7 illustrates an example method 700 for providing a profile indication on a vehicle key fob apparatus that includes a profile indicator and is associated with one of a plurality of driver profiles stored in a vehicle, in accordance with embodiments. The method 700 can be carried out by the vehicle key fob apparatus, such as, for example, the key fob 102 shown in FIG. 1, or more specifically, a computing device included therein, such as, for example, the key fob computing device 200 shown in FIG. 2. For example, the method 700 may be implemented, at least in part, by the processor 202 of the key fob computing device 200 executing software application stored in the memory 204. Further, the vehicle key fob apparatus may interact with a vehicle that is associated therewith, such as, for example, the vehicle 104 shown in FIG. 1, to carry out the operations of the method 700. The profile indicator of the key fob may be, for example, one of the profile indicators 302, 402, 502, and 602 shown in FIGS. 3-6, respectively, or any other output device (such as, e.g., the output devices 214 shown in FIG. 2) capable of presenting the profile indication (such as, e.g., the profile indication 216 shown in FIG. 2).

As shown in FIG. 7, the method 700 begins at step 702, where the key fob, or the key fob computing device therein, transmits a key fob ID (such as, e.g., the key fob ID 212) to the vehicle paired with the key fob. The key fob ID may be included in a radio frequency (RF) signal or other wireless signal transmitted by an antenna (such as, e.g., the antenna 210 shown in FIG. 2) included in the key fob and communicatively coupled to the key fob memory for storing the key fob ID. In embodiments, the processor of the key fob can be configured to generate the wireless signal and cause the antenna to transmit the signal to the vehicle. In some cases, the key fob processor sends the key fob ID in response to a request received from the vehicle. In other cases, the key fob processor automatically transmits the key fob ID upon detecting the vehicle or upon receiving user-selection of an input device of the key fob (e.g., the input devices 206 shown in FIG. 2).

At step 704, the key fob receives, from the vehicle, a profile indication associated with the key fob ID. In embodiments, the profile indication is included in an RF signal or other wireless signal that is transmitted by the vehicle (or more specifically, a telematics unit of the vehicle) and received by the key fob antenna. The antenna then provides the received profile indication to the processor of the key fob.

The content of the profile indication can vary depending on the type of profile indicator included in the key fob. For example, if the profile indicator is a multi-colored LED (such as, e.g., the light device 402 shown in FIG. 4 or the light device 602 shown in FIG. 6), the profile indication can include an identification of the light color that is assigned to the driver profile associated with the key fob and therefore, is to be emitted by the LED on the key fob. As another example, if the profile indicator includes a plurality of light devices (such as, e.g., the LEDs 302 shown in FIG. 3), the profile indication can include an identification of the individual light device that is assigned to the driver profile associated with the key fob and therefore, is to be activated on the key fob. As yet another example, if the profile indicator includes a display device (such as, e.g., the display 502 shown in FIG. 5), the profile indication can include a graphic (e.g., a graphical or textual message) that is assigned to the driver profile associated with the key fob and therefore, is to be displayed on the display of the key fob.

At step 706, the key fob, or more specifically, the key fob processor, stores the profile indication received from the vehicle in the memory of the key fob. At step 708, the key fob presents the stored profile indication, for example, using the profile indicator of the key fob. The profile indication can be stored in the key fob memory to facilitate future retrieval and presentation of the profile indication on the key fob without requiring interaction with the vehicle. For example, the method 700 may be performed the first time the key fob interacts with the vehicle after pairing or associating the key fob to one of the driver profiles stored in the vehicle and after a profile indication has been assigned to the key fob, or more specifically, the driver profile associated therewith, for example, according method 900 shown in FIG. 9 and described in more detail below. Once the method 700 is complete, the key fob may continuously present the profile indication via the profile indicator of the key fob, so that the driver, or other key fob users, can easily differentiate between multiple key fobs for a given vehicle. In other cases, the key fob may be configured to present the profile indication only upon detecting user-selection of an input device on the key fob and/or for only a pre-determined time period, so as to preserve battery power.

Figure 8:
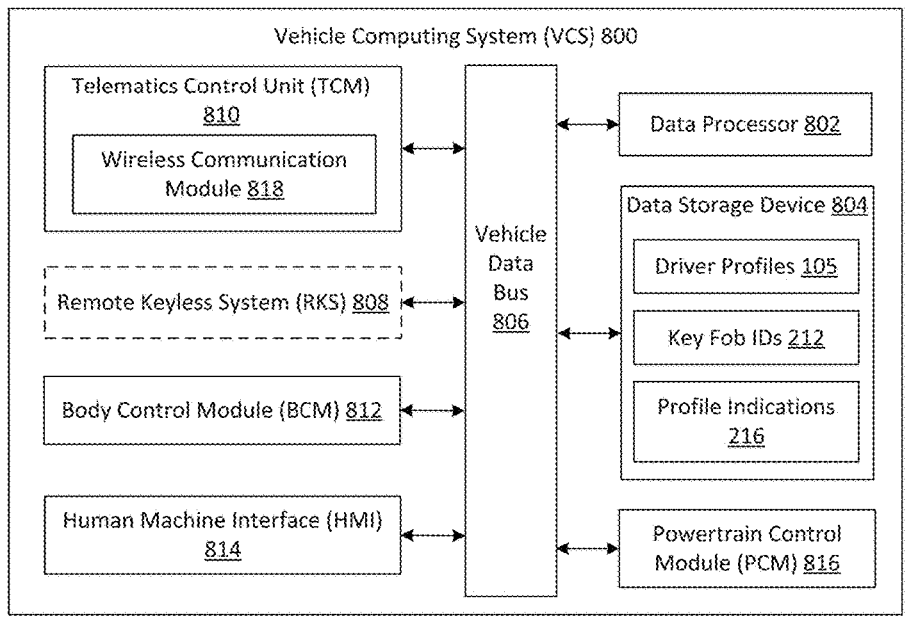
FIG. 8 is a block diagram of an example vehicle computing system included in the vehicle of FIG. 1, in accordance with certain embodiments.

FIG. 8 depicts an exemplary vehicle computing system (VCS) 800 that may be included in the vehicle 104, for example, as part of a vehicle electronics system or an infotainment system of the vehicle 104, in accordance with embodiments. The VCS 800 may be an infotainment system such as the SYNC® system manufactured by FORD MOTOR COMPANY®. Other embodiments of the VCS 800 can include different, fewer, or additional components than those described below and shown in FIG. 8. In embodiments, the VCS 800 can be configured to communicate with the key fob apparatus 102 and receive, process, and execute the command inputs received therefrom.

As shown in FIG. 8, the VCS 800 can include a data processor 802 (e.g., an electronic data processor), a data storage device 804, and a vehicle data bus 806. The VCS 800 can further includes various electronic control units (ECUs) that are responsible for monitoring and controlling the electrical systems or subsystems of the vehicle 104. Each ECU may include, for example, one or more inputs and outputs for gathering, receiving, and/or transmitting data, a memory for storing the data, and a processor for processing the data and/or generating new information based thereon. In the illustrated embodiment, the ECUs of the VCS 800 include a remote keyless system (RKS) 808, a telematics control unit (TCM) 810, a body control module (BCM) 812, a human-machine interface (HMI) 814, and a powertrain control module (PCM) 816.

The ECUs of the VCS 800 can be interconnected by the vehicle bus 806 (such as, e.g., a controller area network (CAN) bus), which passes data to and from the various ECUs, as well as other vehicle and/or auxiliary components in communication with the VCS 800. Further, the data processor 802 can communicate with any one of the ECUs and the data storage device 804 via the data bus 806 in order to carry out one or more functions, including the functions associated with method 900 shown in FIG. 9, or to support interactions with the key fob 102, including those associated with the method 700 shown in FIG. 7.

The remote keyless system (RKS) 808 is an ECU configured to for controlling and monitoring remote, keyless interactions between the key fob 102 and the vehicle 104. The RKS 808 can include a remote keyless entry system and in some cases, a remote keyless ignition system. In the latter case, the RKS 808 may also be referred to as a "passive entry passive start (PEPS) system." In some embodiments, the RKS 808 is a separate, stand-alone ECU that is interconnected to the BCM 812, PCM 816, TCU 810, and other ECUs of the vehicle 104 via the vehicle bus 806 in order to carry out the RKS/PEPS operations. For example, the RKS 808 may receive vehicle commands from the key fob 102 via the TCU 810, process the commands to identify the appropriate ECU for carrying out the command, send the command to the identified ECU, and confirm performance of the command. In other embodiments, the RKS 808 may be comprised of multiple segments that are incorporated into various ECUs of the VCS 800, such as, for example, the BCM 812, the PCM 816, and/or the TCU 810, to process the RKS/PEPS commands received at each ECU. In still other embodiments, the RKS 808 may be included within one ECU, such as, e.g., the TCU 810, in order to handle or process RKS/PEPS commands as they are received by the TCU 810.

The body control module (BCM) 812 is an ECU for controlling and monitoring various electronic accessories in a body of the vehicle 104. In embodiments, the BCM 812 is an ECU that controls the doors of the vehicle 104, including locking, unlocking, opening, and/or closing said doors. In some embodiments, the BCM 812 also controls the power windows, power roof (e.g., moonroof, sunroof, convertible top, etc.), and interior lighting of the vehicle 104. The BCM 812 may also control other electronically-powered components in the body of the vehicle 104, such as, for example, air-conditioning units, power mirrors, and power seats. In cases where the BCM 812 only controls and monitors the doors of the vehicle 104, the BCM 812 may be referred to as the door control unit (DCU), as will be appreciated. The BCM 812 can be configured to implement commands received from the key fob 102 that are related to the doors, windows, or other body components controlled by the BCM 812.

The powertrain control module (PCM) 816 is an ECU for controlling and monitoring the engine and transmission of the vehicle 104. In some embodiments, the PCM 816 can be separated into two separate ECUs, specifically an engine control unit and a transmission control unit. In either case, the PCM 816 can be configured to control starting and stopping of the engine of the vehicle 104, and may implement commands to start the engine received from the key fob 102.

The telematics control unit (TCU) 810 is an ECU for enabling the vehicle 104 to connect to various wireless networks, including, for example, GPS, WiFi, cellular, Bluetooth, NFC, RFID, satellite, and/or infrared. In embodiments, the TCU 810 (also referred to as a "vehicle telematics unit") includes a wireless communication module 818 comprising one or more antennas, radios, modems, receivers, and/or transmitters (not shown) for connecting to the various wireless networks. For example, the wireless communication module 818 can include a mobile communication unit (not shown) for wirelessly communicating over a cellular network (e.g., GSM, GPRS, LTE, 3G, 4G, CDMA, etc.), an 802.11 network (e.g., WiFi), a WiMax network, and/or a satellite network. The TCU 810 can also be configured to control tracking of the vehicle 104 using latitude and longitude values obtained from a GPS satellite. In a preferred embodiment, the wireless communication module 818 includes a Bluetooth or other short-range receiver (not shown) for receiving vehicle commands and/or data (e.g., the key fob ID 212) transmitted by the key fob 102, and a Bluetooth or other short-range transmitter (not shown) for sending data (e.g., the profile indication 216) to the key fob 102.

In embodiments, the TCU 810 receives external data, including command inputs from the key fob 102, via the wireless communication module 818 and provides the external data to an appropriate ECU of the VCS 800. For example, if the TCU 810 receives a lock door command, the TCU 810 sends the command to the BCM 812 via the vehicle bus 806. Likewise, if the TCU 810 receives a start engine command, the TCU 810 sends the command to the PCM 816 via the vehicle bus 806. In some embodiments, the TCU 810 also receives internal data from other ECUs of the VCS 800 and/or the data processor 802, with instructions to transmit the internal data to the vehicle 104, or another component of the wireless system 100.

The human-machine interface (HMI) 814 (also referred to as a "user interface") can be an ECU for enabling user interaction with the vehicle 104 and for presenting vehicle information to the vehicle operator or driver. Though not shown, the HMI 814 can comprise an instrument panel (IP), a media display screen, as well as one or more input devices and/or output devices for inputting, entering, receiving, capturing, displaying, or outputting data associated with the vehicle computing system 800, the method 900 shown in FIG. 9, or the techniques disclosed herein. The HMI 814 can be configured to interact with the other ECUs of the VCS 800 and/or the data processor 802 via the data bus 806 in order to provide information or inputs received via the HMI 814 to an appropriate component of the VCS 800 and to present, to the vehicle operator or driver, information or outputs received from the various components of the VCS 800.

The data processor 802 can comprise one or more of a microprocessor, a microcontroller, a programmable logic array, an application-specific integrated circuit, a logic device, or other electronic device for processing, inputting, outputting, manipulating, storing, or retrieving data. In embodiments, the VCS 800 can comprise a general purpose computer that is programmed with various programming instructions or modules stored in the data storage device 804 (e.g., electronic memory), or elsewhere.

The data storage device 804 can comprise one or more of electronic memory, nonvolatile random access memory (e.g., RAM), flip-flops, a computer-writable or computer-readable storage medium, a magnetic or optical data storage device, a magnetic or optical disc drive, a hard disk drive, or other electronic device for storing, retrieving, reading, or writing data. The data storage device 804 stores one or more software program modules or software instructions, including the method 900, for execution by the data processor 802. As shown in FIG. 8, the data storage device 804 also stores the driver profiles 105 generated for the vehicle 104, the key fob IDs 212 associated with the key fobs paired to the vehicle 104, and the profile indications 216 assigned to the paired key fobs, as described herein.

Figure 9:
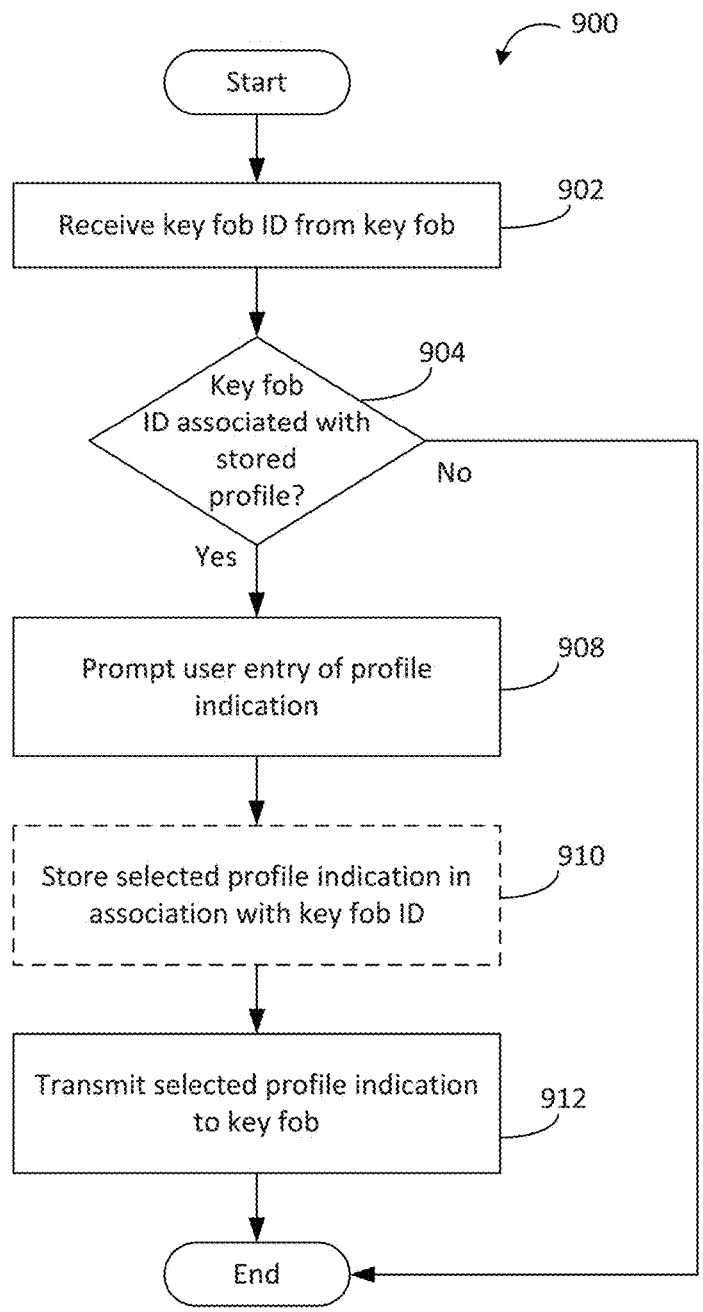
FIG. 9 is a flow diagram of an example method for generating a key fob indicator using a vehicle computing system, in accordance with certain embodiments.

FIG. 9 illustrates an example method 900 for generating a profile indication for a key fob apparatus associated with a driver profile stored in a vehicle, in accordance with embodiments. The method 900 can be carried out by one or more processors (or controllers) included in, for example, a vehicle computing system (such as, e.g., the vehicle computing system 800 shown in FIG. 8). In one embodiment, the method 800 is implemented, at least in part, by the data processor 802 of the VCS 800 executing software stored in the data storage device 804 and interacting with one or more other components of the VCS 800, such as, for example, the HMI 814 and the TCU 810. Further, the vehicle may interact with a key fob associated or paired therewith, such as, for example, the key fob 102 shown in FIG. 1, to carry out the operations of the method 900.

The method 900 can begin at step 902, where the vehicle computing system, or a processor therein, receives a key fob ID (such as, e.g., the key fob ID 212) from a key fob paired with the vehicle. The key fob ID may be included in a radio frequency (RF) or other wireless signal that is transmitted by an antenna of the key fob and received by a vehicle telematics unit (such as, e.g., TCU 810 shown in FIG. 8) of the vehicle, where the vehicle telematics unit provides the received key fob ID to the vehicle processor. At step 904, the processor determines whether the key fob ID is associated with one of the stored driver profiles by comparing the received ID with the IDs stored in a vehicle memory. For example, as shown in FIG. 8, the data storage device 804 of the VCS 800 can store key fob IDs 212 for each of the key fobs that are paired to, or associated with, the vehicle 104. At step 904, the processor 802 of the VCS 800 can use the stored key fob IDs 212 to authenticate the source of the key fob ID as one of the key fobs paired to the vehicle 104.

If no match is found (e.g., a determination of "no" at step 904), no further action may be taken, and the method 900 may come to an end. In some cases, an error message may be displayed via a user interface or HMI of the vehicle to inform the driver or user of the vehicle that the key fob associated with the received key fob ID is not paired to, or authorized for, the vehicle. If, on the other hand, a match is made (e.g., a determination of "yes" at step 904), the method 900 continues to step 908, where the vehicle prompts the user or driver to select, or otherwise enter, a profile indication for the key fob currently communicating with the vehicle.

In some embodiments, the processor is configured to present user-selectable options via the vehicle HMI for selecting the profile indication to be assigned to the key fob. The number and type of user-selectable options (e.g., buttons, touch input options, or other input devices) can vary depending on the type of profile indicator (such as, e.g., profile indicator 101 shown in FIG. 1) included on the key fob. For example, for the key fob 300 shown in FIG. 3, the user-selectable options can include inputs for each of the LEDs 302, and upon selection of one of the inputs, the corresponding LED 302 can be assigned to the key fob 300, thus generating the profile indication 216 for the key fob 300. As another example, for the key fobs 400 and 600 shown in FIGS. 4 and 6, respectively, the user-selectable options can include inputs for each color of the light device 402 or 602, respectively, and upon selection of one of the inputs, the corresponding color can be assigned to the key fob 400 or 600, respectively, thus generating the profile indications 216 for the key fobs 400 and 600. With respect to key fob 500 shown in FIG. 5, the user-selectable options can include inputs for selecting the message, icon, image, or other graphic to be displayed on the display device 502 as the profile indication 216. In some cases, the inputs may be pre-configured options, such as, for example, numbers 1, 2, and 3, or a fixed set of symbols. In other cases, the inputs can include a keyboard or other user interface for enabling the user to enter any message, icon, or image, including images or photographs downloaded from an external source.

In other embodiments, the profile indication assigned to each driver profile are pre-determined, and the processor is configured to present user-selectable options on the vehicle HMI only for selecting the driver profile to be assigned to the key fob. In such cases, only the assignment of a given driver profile to the key fob can be controlled by the user, but not the profile indication that is assigned to the driver profile. For example, the user-selectable options may include inputs for each of "driver profile 1," "driver profile 2," and "driver profile 3," and upon selection of one of the inputs, the profile indication pre-associated with the selected driver profile is automatically assigned to the key fob. The exact type of pre-determined profile indication can vary depending on the type of profile indicator included on the key fob, for example, as described herein with respect to FIGS. 3-6.

In some embodiments, the method 900 includes step 910, where the vehicle processor stores the selected profile indication in association with the received key fob ID in the vehicle memory. For example, the selected profile indication may be linked to the received key fob ID and/or to the driver profile associated with the key fob ID in a data table (not shown) stored in the vehicle memory. This same data table may be used during future interactions between the vehicle and the key fob. For example, upon detecting a key fob within a vicinity of the vehicle, the vehicle can access the data table to identify the driver profile that is associated with the detected key fob and restore the vehicle settings included in the associated profile. In other embodiments, the method 900 continues directly from step 908 to step 912 without storing the selected profile indication.

At step 912, the selected profile indication is transmitted to the key fob for presentation thereon. For example, the vehicle processor may provide the selected profile indication to the vehicle telematics unit, which may wirelessly transmit the profile indication to the key fob. Upon receipt of the profile indication (for example, at step 704 of the method 700 shown in FIG. 7), the key fob can store (e.g., at step 706) and present (e.g., at step 708) the profile indication using the profile indicator included on the key fob. Once the profile indication is sent to the key fob at step 912, or after the error message is displayed at step 906, the method 900 may end.

As will be appreciated, the methods 700 and 900 require a key fob that is capable of two-way or bi-directional communication with the vehicle paired thereto in order for a user-selected profile indication to be generated using the vehicle and sent to and presented on the key fob. However, in some cases, specifically the case of key fobs that are capable of only one-directional communication (e.g., where the communication is only sent from the key fob to the vehicle), the profile indicator for each key fob may be permanently configured to present a pre-selected profile indication. In such cases, the user may use the vehicle HMI to adjust the settings of the driver profile that is associated with a given key fob, but not the profile indication presented by the key fob.

For example, the vehicle may be configured to store up to a certain number of driver profiles in respective preset storage locations (e.g., a first profile location, a second profile location, and a third profile location) within the vehicle memory, and the vehicle may be paired to a matching number of key fobs, each key fob being pre-assigned to the profile that is stored, or will be stored, in a respective one of the three storage locations. In one example embodiment, a first key fob is associated with, and programmed to present a profile indication for, the profile stored in the first location, a second key fob is associated with, and programmed to present a profile indication for, the profile stored in the second location, and a third key fob is associated with, and programmed to present a profile indication for, the profile stored in the third location. In such cases, the unique identifier for each of the three key fobs can be configured to include the profile indication for the key fob, for example, in the form of a modification or add-on to the unique identifier (e.g., a "−1" for the first profile, a "−2" for the second profile, etc.). As a result, when one of these key fobs communicates its unique identifier to the vehicle, the profile indication can be automatically communicated as well. Then, based on the received identifier, the vehicle can determine which driver profile that is associated with the key fob and can restore the settings included in the appropriate driver profile.

Referring back to FIG. 1, in some embodiments, the wireless system 100 further includes a mobile device 106 that is paired to the vehicle 104 using known wireless pairing techniques. The mobile device 106 may communicate with the vehicle 104, or more specifically, the VCS 800 included therein, via a cloud computing network 108 and using Bluetooth, infrared, radio frequency identification (RFID), near field communication (NFC), WiFi, or any other wireless communication technology compatible with the TCU 810 and the cloud computing network 108. The mobile device 106 may be any type of portable electronic device, including, for example, a smartphone or other mobile telephone, a tablet or tablet-type personal computer, a personal digital assistant (PDA), a smartwatch or other wearable device, and the like. The mobile device 106 can include a software application 110 that is configured to communicate with the vehicle 104 via the cloud network 108. The software application 110 (also referred to here as a "vehicle application") can be a mobile client that is developed by, and/or associated with, the vehicle manufacturer, and can be customized for the vehicle 104.

In embodiments, the vehicle application 110 can be specifically designed for generating a profile indication for the key fob 102 and/or managing the driver profiles 105 and profile indications 216 stored in the vehicle 104. For example, at step 908 of the method 900 shown in FIG. 9, the vehicle processor may present the user-selectable options for selecting a profile indication on the mobile device 106 via the vehicle application 110, and may receive the user-selected profile indication from the mobile device 106. In such cases, user control or selection of the profile indication may occur through the vehicle application 110 instead of the vehicle HMI. The vehicle application 110 may also provide over vehicle information, such as, for example, diagnostic and/or performance information about the vehicle 104, for example, in connection with a vehicle infotainment system (such as, e.g., FORD SYNC®). In embodiments, all or a portion of the vehicle application 110 can be stored in a memory (not shown) of the mobile device 106.

The cloud network 108 can be any wireless communication network, such as, for example, a WiFi network or other wireless Ethernet, cellular network, and/or satellite. In embodiments, the cloud computing network 108 can be communicatively linked to a remote server or cloud computing device (not shown) that is controlled by, and/or associated with, the vehicle manufacturer. In some embodiments, a secure, wireless communication channel may be pre-established between the VCS 800 of the vehicle 104 and the cloud computing device in order to enable direct communication between the vehicle 104 and the cloud device without the need for pairing or pre-authorization. The secure communication channel may be established by, or under the supervision of, the vehicle manufacturer. In some cases, the driver profiles 105, the key fob IDs 212, and/or the profile indications 216 may be stored on the cloud computing device and/or in the mobile device 106 to enable remote access to and control of the profile indicator 101 for the key fob 102.

In certain embodiments, the process descriptions or blocks in the figures, such as FIGS. 7 and 9, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. A key fob comprising:
an antenna to:
communicate a key fob ID to a vehicle when the antenna receives a request from the vehicle; and
receive, from the vehicle, an input associated with the key fob ID for one of a plurality of driver profiles;
an input device;
memory to store the input; and
a display to show a visual assigned to the stored input for a predetermined period when the input device is actuated.

2. The key fob of claim 1, including an audio device, wherein the antenna is configured to receive, from the vehicle, a sound associated with the key fob ID for the one of the plurality of driver profiles.

3. The key fob of claim 1, wherein a processor controls the antenna to automatically communicate the key fob ID to the vehicle when the key fob detects the vehicle.

4. The key fob of claim 1, including an input device, wherein a light device displays a color only when the input device detects a user selection.

5. A method to indicate user profiles associated with key fobs, the method comprising:
responsive to receiving a request from a vehicle, communicating, via an antenna of a key fob, a key fob identifier to the vehicle;
receiving, via the antenna, an input associated with the key fob ID for one of a plurality of driver profiles associated with the vehicle;
storing, via memory of the key fob, the input; and
responsive to actuating an input device, showing, via a display of the key fob, a visual assigned to the input for a predetermined period.

6. The method of claim 5, wherein the display is a light emitting diode (LED).

* * * * *